US012304514B2

United States Patent
Islam et al.

(10) Patent No.: US 12,304,514 B2
(45) Date of Patent: May 20, 2025

(54) METHOD FOR FOLLOWING A LEAD VEHICLE WITHOUT VEHICLE-TO-VEHICLE COMMUNICATION

(71) Applicant: GM Global Technology Operations LLC, Detroit, MI (US)

(72) Inventors: Md Mhafuzul Islam, Warren, MI (US); Arun Adiththan, Sterling Heights, MI (US); Prakash M. Peranandam, Rochester Hills, MI (US); Ramesh Sethu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 18/174,827

(22) Filed: Feb. 27, 2023

(65) Prior Publication Data
US 2024/0286629 A1   Aug. 29, 2024

(51) Int. Cl.
*B60W 50/08* (2020.01)
*B60W 30/12* (2020.01)
(Continued)

(52) U.S. Cl.
CPC .......... *B60W 50/082* (2013.01); *B60W 30/12* (2013.01); *B60W 30/165* (2013.01);
(Continued)

(58) Field of Classification Search
CPC .... B60W 50/082; B60W 50/14; B60W 50/00; B60W 30/12; B60W 30/165; B60W 30/18163; B60W 60/0053; B60W 60/0001; B60W 2540/215; B60W 2552/05; B60W 2552/10; B60W 2552/53;
(Continued)

(56) References Cited

U.S. PATENT DOCUMENTS

| 6,339,740 B1 * | 1/2002 | Seto ..................... B60K 31/047 340/904 |
| 2012/0221168 A1 | 8/2012 | Zeng et al. |
| 2013/0179036 A1 | 7/2013 | Lee et al. |
| 2016/0009281 A1 * | 1/2016 | Tokimasa .............. G01S 13/931 701/96 |
| 2016/0140843 A1 | 5/2016 | Tosa |
| 2018/0348769 A1 | 12/2018 | Sato et al. |

(Continued)

FOREIGN PATENT DOCUMENTS

GB         2500426 A  *  9/2013  .......... B60W 30/143

*Primary Examiner* — Michael J Zanelli
(74) *Attorney, Agent, or Firm* — Vivacqua Crane, PLLC (57) ABSTRACT

A system for controlling an ego vehicle following a lead vehicle without vehicle-to-vehicle (V2V) communication includes sensors disposed on the ego vehicle and capturing ego and lead vehicle condition information. Control modules disposed in the ego vehicle each have a processor, memory, and input/output (I/O) ports. The I/O ports communicate with the one or more sensors. The memory stores control logic, and the processor executes the control logic, including a lead vehicle following (LVF) application. A first control logic receives a start input from a vehicle occupant via a human-machine interface (HMI) in communication with the I/O ports. A second control logic performs a feasibility analysis of ego and lead vehicle conditions according to feasibility conditions. A third control logic selectively initiates lead vehicle following. A fourth control logic continuously monitors feasibility of lead vehicle following, and fifth control logic selectively disables the LVF application upon receiving a disengagement command.

18 Claims, 5 Drawing Sheets

(51) Int. Cl.
*B60W 30/165* (2020.01)
*B60W 30/18* (2012.01)
*B60W 50/14* (2020.01)
*B60W 60/00* (2020.01)

(52) U.S. Cl.
CPC ...... *B60W 30/18163* (2013.01); *B60W 50/14* (2013.01); *B60W 60/0053* (2020.02); *B60W 2540/215* (2020.02); *B60W 2552/05* (2020.02); *B60W 2552/10* (2020.02); *B60W 2552/53* (2020.02); *B60W 2554/402* (2020.02); *B60W 2554/4041* (2020.02); *B60W 2554/4045* (2020.02); *B60W 2554/802* (2020.02); *B60W 2555/20* (2020.02)

(58) Field of Classification Search
CPC ... B60W 2554/402; B60W 2554/4041; B60W 2554/4045; B60W 2554/802; B60W 2555/20; B60W 2050/146
See application file for complete search history.

(56) References Cited

U.S. PATENT DOCUMENTS

| | | |
|---|---|---|
| 2019/0378363 A1 | 12/2019 | Becker |
| 2020/0326701 A1 | 10/2020 | Takechi et al. |
| 2021/0325197 A1 | 10/2021 | Ohmura et al. |
| 2024/0043002 A1* | 2/2024 | Beaucaire ............. B60W 10/06 |

* cited by examiner

METHOD FOR FOLLOWING A LEAD VEHICLE WITHOUT VEHICLE-TO-VEHICLE COMMUNICATION

INTRODUCTION

The present disclosure relates to vehicle control systems and more specifically to automated driver assistance systems (ADAS) that control vehicle dynamics. Increasingly, vehicles are being equipped with ADAS systems that control or aid vehicle occupants in controlling a wide variety of vehicle dynamic functions. Some vehicles are available with varying degrees of "hands-off" functionality in which the vehicle can operate without human input for varying periods of time, or until the occurrence of a particular condition or set of conditions. Vehicles equipped with ADAS functionality require input from a variety of different sensors and many also communicate with other vehicles through vehicle-to-vehicle (V2V) communication systems, or with infrastructure through vehicle-to-infrastructure (V2I) communication systems.

However, not all vehicles support V2V or V2I communication, and without such communication ADAS functionality can be limited, and human vehicle operator input may be required to frequently make corrections or assist in driving the vehicle. Accordingly, while current systems and methods for controlling vehicle functions through ADAS operate for their intended purpose, there is a need for new and improved systems and methods for controlling vehicle dynamic functions with ADAS that operate to allow ego or host vehicles to follow lead vehicles without V2V communication, without increasing complexity, and which maintain or improve vehicle operator comfort and which provide system redundancy.

SUMMARY

According to several aspects of the present disclosure a system for controlling an ego vehicle following a lead vehicle without vehicle-to-vehicle (V2V) communication includes one or more sensors disposed on the ego vehicle and capturing ego vehicle condition information and lead vehicle condition information. The system further includes one or more control modules disposed in the ego vehicle, each of the one or more control modules having a processor, a memory, and one or more input/output (I/O) ports, the I/O ports in communication with the one or more sensors. The memory stores programmatic control logic, and the processor executes the programmatic control logic. The programmatic control logic includes a lead vehicle following (LVF) application having a first control logic for receiving a start input from a vehicle occupant via a human-machine interface (HMI) in communication with the I/O ports. A second control logic performs a feasibility analysis of ego vehicle and lead vehicle conditions according to feasibility conditions. A third control logic selectively initiates lead vehicle following. A fourth control logic continuously monitors feasibility of lead vehicle following. A fifth control logic selectively disables the LVF application upon receiving a disengagement command.

In another aspect of the present disclosure the first control logic further includes control logic for presenting the vehicle occupant with a first prompt and a second prompt. In response to receiving the first prompt, the vehicle occupant generates the start input that initializes a LVF application. In response to initializing the LVF application, the second prompt is presented to the vehicle occupant. The second prompt presents a friend mode selection and a public mode selection. In response to the second prompt, the vehicle occupant selects a known lead vehicle via the friend mode selection, or the vehicle occupant selects an unknown lead vehicle via the public mode selection.

In another aspect of the present disclosure the second control logic further includes control logic for determining environmental conditions.

The environmental conditions include: identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning system (GPS) availability, visibility, weather conditions, road type, road conditions, ego vehicle type, and lead vehicle type.

In another aspect of the present disclosure the second control logic further includes control logic for calculating a feasibility score from the feasibility conditions, and control logic for comparing the feasibility score to an initialization threshold. Upon determining that the feasibility score is less than the initialization threshold the system presents a notice of unavailability to the vehicle occupant, and engages a manual driving mode of the vehicle. Upon determining that the feasibility score is greater than or equal to the initialization threshold, the system presents the vehicle occupant with a second prompt. The second prompt is a request for confirmation to initialize the LVF application.

In another aspect of the present disclosure the third control logic further includes control logic for receiving a confirmation input, via the HMI, from the vehicle occupant, and engaging the LVF application and following the lead vehicle.

In another aspect of the present disclosure the fourth control logic for continuously monitoring feasibility of lead vehicle following further includes continuously monitoring the environmental conditions, continuously monitoring the lead vehicle state, including the state of the lead vehicle brake lights, the lead vehicle indicator lights, and the position of the lead vehicle within the one or more lanes, continuously monitoring an ego vehicle state, and continuously monitoring a distance from the ego vehicle to the lead vehicle.

In another aspect of the present disclosure upon determining that the lead vehicle is changing lanes from a first lane to a second lane of the one or more lanes, the system re-executes the second control logic to determine feasibility of continuing to follow the lead vehicle utilizing the LVF application. Upon determining that the feasibility score is less than the initialization threshold the system presents a notice of unavailability to the vehicle occupant, and generates the disengagement command to disengage the LVF application and engages at least one of: a manual driving mode of the vehicle and an advanced driver assistance system (ADAS) assisted driving mode of the vehicle. The ADAS assisted driving mode operates without the LVF application. Upon determining that the feasibility score is greater than or equal to the initialization threshold, the system selectively activates one or more ADAS functions of the ego vehicle to cause the ego vehicle to continue following the lead vehicle from the first lane to the second lane with the LVF application.

In another aspect of the present disclosure upon determining that the lead vehicle is not changing lanes, the system executes control logic to determine whether a lead vehicle lane is different from a current ego vehicle lane. Upon determining that the lead vehicle is in a different lane from the current ego vehicle lane, the system determines a feasibility of continuing to follow the lead vehicle utilizing the LVF application. Upon determining that the feasibility score is less than the initialization threshold the system presents a notice of unavailability to the vehicle occupant, and generates the disengagement command to disengage the LVF application and engages at least one of: a manual driving mode of the vehicle and an ADAS assisted driving mode of the vehicle. The ADAS assisted driving mode operates without the LVF application. Upon determining that the feasibility score is greater than or equal to the initialization threshold, the system selectively activates one or more ADAS functions to cause the ego vehicle to move from the current ego vehicle lane to the lead vehicle lane utilizing the LVF application.

In another aspect of the present disclosure the one or more ADAS functions further include an automatic lane change function, an automatic lane keep function, and an automatic speed control function.

In another aspect of the present disclosure the fifth control logic further includes control logic for receiving a manual disengagement command from the vehicle occupant, and in response to receiving the manual disengagement command, disengaging the LVF application and engaging at least one of: a manual driving mode of the vehicle and an ADAS assisted driving mode of the vehicle. The ADAS assisted driving mode operates without the LVF application.

In another aspect of the present disclosure a method for controlling an ego vehicle following a lead vehicle without vehicle-to-vehicle (V2V) communication. The method includes capturing ego vehicle condition information and lead vehicle condition information with one or more sensors disposed on the ego vehicle. The method further includes utilizing one or more control modules disposed in the ego vehicle, each of the one or more control modules having a processor, a memory, and one or more input/output (I/O) ports, the memory storing programmatic control logic, the processor executing the programmatic control logic, the programmatic control logic including a lead vehicle following (LVF) application including: receiving a start input from a vehicle occupant via a human-machine interface (HMI) in communication with the I/O ports, performing a feasibility analysis of ego vehicle and lead vehicle conditions according to feasibility conditions, and selectively initiating the LVF application. The programmatic control logic further includes continuously monitoring feasibility of using the LVF application, and selectively disabling the LVF application upon receiving a disengagement command.

In another aspect of the present disclosure the method further includes presenting the vehicle occupant with a first prompt and a second prompt. In response to the first prompt, the programmatic control logic receives a start input from the vehicle occupant, and the start input initializes the LVF application. In response to initializing the LVF application, the programmatic control logic presents the second prompt to the vehicle occupant. The second prompt presents a friend mode selection and a public mode selection. In response to the second prompt, the vehicle occupant selects a known lead vehicle via the friend mode selection, or the vehicle occupant selects an unknown lead vehicle via the public mode selection.

In another aspect of the present disclosure the method further includes determining environmental conditions from the ego vehicle condition information and the lead vehicle condition information. The environmental conditions include: identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning method (GPS) availability, visibility, weather conditions, road type, road conditions, ego vehicle type, and lead vehicle type.

In another aspect of the present disclosure the method further includes calculating a feasibility score from the feasibility conditions, and comparing the feasibility score to an initialization threshold. Upon determining that the feasibility score is less than the initialization threshold the method presents a notice of unavailability to the vehicle occupant, and engages a manual driving mode of the vehicle. Upon determining that the feasibility score is greater than or equal to the initialization threshold, the method presents the vehicle occupant with a second prompt, and the second prompt is a request for confirmation to initialize the LVF application. The method receives a confirmation input, via the HMI, from the vehicle occupant, and engages the LVF application and follows the lead vehicle.

In another aspect of the present disclosure the method further includes continuously monitoring feasibility of utilizing the LVF application, including: continuously monitoring the environmental conditions, continuously monitoring the lead vehicle state, including the state of the lead vehicle brake lights, the lead vehicle indicator lights, and the position of the lead vehicle within the one or more lanes, continuously monitoring an ego vehicle state, and continuously monitoring a distance from the ego vehicle to the lead vehicle.

In another aspect of the present disclosure the method further includes determining that the lead vehicle is changing lanes from a first lane to a second lane of the one or more lanes, and continuously determining the feasibility of continuing to follow the lead vehicle utilizing the LVF application. Upon determining that the feasibility score is less than the initialization threshold the method presents a notice of unavailability to the vehicle occupant, and generates the disengagement command to disengage the LVF application and engages at least one of: a manual driving mode of the vehicle and an automated driver assistance system (ADAS) assisted driving mode of the vehicle. The ADAS assisted driving mode operates without the LVF application. Upon determining that the feasibility score is greater than or equal to the initialization threshold, the method selectively activates one or more ADAS functions of the ego vehicle to cause the ego vehicle to continue following the lead vehicle from the first lane to the second lane utilizing the LVF application.

In another aspect of the present disclosure the method further includes determining that the lead vehicle is not changing from the first lane to the second lane, and determining that a lead vehicle lane is different from a current ego vehicle lane. Upon determining that the lead vehicle is in a different lane from the current ego vehicle lane, the method determines the feasibility of continuing to follow the lead vehicle utilizing the LVF application. Upon determining that the feasibility score is less than the initialization threshold the method presents a notice of unavailability to the vehicle occupant, and generates the disengagement command to disengage the LVF application and engages at least one of: a manual driving mode of the vehicle and an ADAS assisted driving mode of the vehicle. The ADAS assisted driving mode operates without the LVF application. Upon determining that the feasibility score is greater than or equal to the initialization threshold, the method selectively activates one or more ADAS functions to cause the ego vehicle to move from the current ego vehicle lane to the lead vehicle lane using the LVF application.

In another aspect of the present disclosure the method further includes selectively activating one or more ADAS functions further includes engaging one or more of: an automatic lane change function, an automatic lane keep function; and an automatic speed control function.

In another aspect of the present disclosure the method further includes receiving a manual disengagement command from the vehicle occupant, and in response to receiving the manual disengagement command, the method disengages the LVF application and engages at least one of: a manual driving mode of the vehicle and an ADAS assisted driving mode of the vehicle. The ADAS assisted driving mode operates without the LVF application.

In another aspect of the present disclosure the method further includes a method for controlling an ego vehicle following a lead vehicle without vehicle-to-vehicle (V2V) communication includes capturing ego vehicle condition information and lead vehicle condition information with one or more sensors disposed on the ego vehicle, and utilizing one or more control modules disposed in the ego vehicle. Each of the one or more control modules has a processor, a memory, and one or more input/output (I/O) ports. The memory stores programmatic control logic, the processor executes the programmatic control logic. The programmatic control logic includes a lead vehicle following (LVF) application having control logic for receiving a start input from a vehicle occupant via a human-machine interface (HMI) in communication with the I/O ports. Receiving a start input further includes presenting the vehicle occupant with a first prompt and a second prompt, and in response to the first prompt, receiving the start input from the vehicle occupant. The start input initializes the LVF application. In response to initializing the LVF application, the method presents the second prompt to the vehicle occupant. The second prompt presents a friend mode selection and a public mode selection. In response to the second prompt, the vehicle occupant selects a known lead vehicle via the friend mode selection, or the vehicle occupant selects an unknown lead vehicle via the public mode selection. The programmatic control logic of the method determines environmental conditions from the ego vehicle condition information and the lead vehicle condition information. The environmental conditions include identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning method (GPS) availability, visibility, weather conditions, road type, road conditions, ego vehicle type, and lead vehicle type. The programmatic control logic of the method performs a feasibility analysis of ego vehicle and lead vehicle conditions according to feasibility conditions by: calculating a feasibility score from the feasibility conditions, comparing the feasibility score to an initialization threshold, and upon determining that the feasibility score is less than the initialization threshold presents a notice of unavailability to the vehicle occupant, and engages a manual driving mode of the vehicle. Upon determining that the feasibility score is greater than or equal to the initialization threshold, the programmatic control logic of the method presents the vehicle occupant with a second prompt. The second prompt is a request for confirmation to initialize the LVF application. The method further includes selectively initiating the LVF application upon receiving a confirmation input, via the HMI, from the vehicle occupant, and engaging the LVF application and following the lead vehicle. The method further includes continuously monitoring feasibility of utilizing the LVF application, including continuously monitoring the environmental conditions, continuously monitoring the lead vehicle state, including the state of the lead vehicle brake lights, the lead vehicle indicator lights, and the position of the lead vehicle within the one or more lanes; continuously monitoring an ego vehicle state, and continuously monitoring a distance from the ego vehicle to the lead vehicle. The method further includes determining that the lead vehicle is changing lanes from a first lane to a second lane of the one or more lanes, and continuously determining the feasibility of continuing to follow the lead vehicle utilizing the LVF application. Upon determining that the feasibility score is less than the initialization threshold the method presents a notice of unavailability to the vehicle occupant, and generates a disengagement command to disengage the LVF application and engages at least one of: a manual driving mode of the vehicle and an advanced driver assistance system (ADAS) assisted driving mode of the vehicle. The ADAS assisted driving mode operates without the LVF application. Upon determining that the feasibility score is greater than or equal to the initialization threshold, the method selectively activates one or more advanced driver assistance system ADAS functions of the ego vehicle to cause the ego vehicle to continue following the lead vehicle from the first lane to the second lane. The method further includes determining that the lead vehicle is not changing from the first lane to the second lane, and determining that a lead vehicle lane is different from a current ego vehicle lane. Upon determining that the lead vehicle is in a different lane from the current ego vehicle lane, the method determines the feasibility of continuing to follow the lead vehicle utilizing the LVF application. Upon determining that the feasibility score is less than the initialization threshold the method presents a notice of unavailability to the vehicle occupant, and generates the disengagement command to disengage the LVF application and engages at least one of: a manual driving mode of the vehicle and an ADAS assisted driving mode of the vehicle. The ADAS assisted driving mode operates without the LVF application. Upon determining that the feasibility score is greater than or equal to the initialization threshold, the method selectively activates one or more ADAS functions to cause the ego vehicle to move from the current ego vehicle lane to the lead vehicle lane. The method selectively disables the LVF application upon receiving a manual disengagement command generated by the vehicle occupant. In response to receiving the manual disengagement command, the method disengages the LVF application and engages at least one of: a manual driving mode of the vehicle and an ADAS assisted driving mode of the vehicle. The ADAS assisted driving mode operates without the LVF application.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
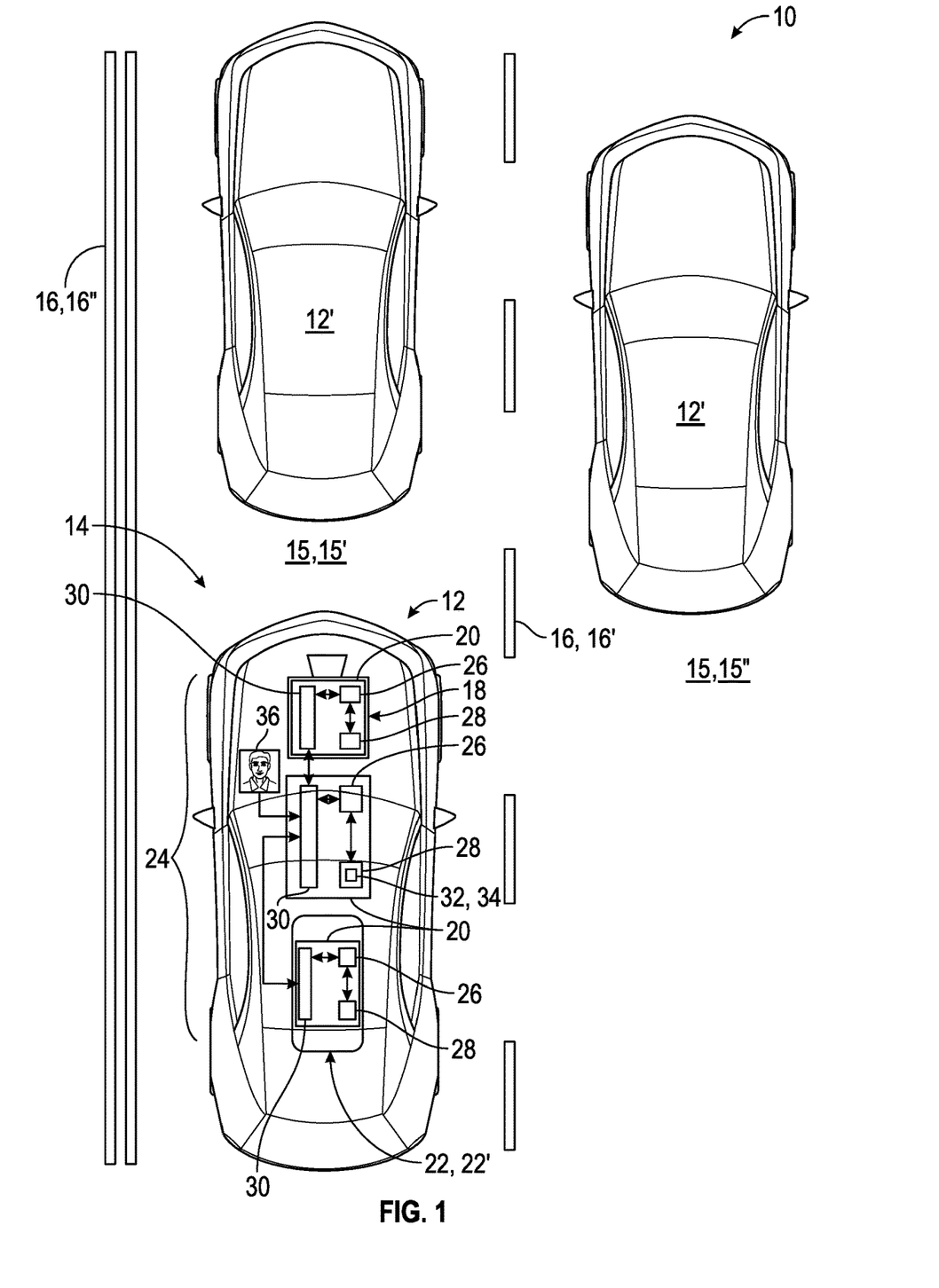
FIG. 1 is an environmental view of a system for lead vehicle following (LVF) without vehicle-to-vehicle (V2V) communication according to an exemplary embodiment.

Referring to FIG. 1 a system 10 for controlling an ego vehicle 12 following a lead vehicle 12' without vehicle-to-vehicle (V2V) communication is shown. The ego vehicle 12 and lead vehicle 12' may be any of a wide variety of vehicles 12 without departing from the scope or intent of the present disclosure. In some examples, the ego vehicle 12 and the lead vehicle 12' may be cars, trucks, sport-utility vehicles (SUVs), busses, semi-tractors, tractors used in farming or construction or the like, watercraft, aircraft such as planes or helicopters, or the like. Further, it should be appreciated the that the ego vehicle 12 and lead vehicle 12' may be the same type of vehicle or may be different from one another. The ego and lead vehicles 12, 12' are shown traveling on a road 14 having a plurality of lanes 15 defined by lane markings 16. The ego and lead vehicles 12, 12' may travel along any type of road 14 having any type of road 14 surface, including any type of pavement, gravel, dirt, ice, or other types of surfaces. Further, while the lane markings 16 are shown as dashed lines 16' and double solid lines 16", it should be appreciated that any types of road markings or lane markings 16 may be present without departing from the scope or intent of the present disclosure.

The system 10 generally includes one or more sensors 18 in communication with one or more control modules 20 and a human-machine interface (HMI) 22 via a wired or wireless (Wi-Fi) communications network 24. While only a single sensor 18 is shown on the ego vehicle 12, and the sensor 18 depicted is a camera, it should be appreciated that the sensor 18 shown is intended to represent any of a variety of sensors 18 which may be linked to and communicate on the communications network 24. The sensors 18 may capture ego vehicle 12 position information, electromagnetic and/or optical information in a variety of different wavelengths including those visible to humans as well as infrared, ultraviolet, and other such portions of the light spectrum that are not visible by humans. That is, the sensors 18 may be Global Positioning System (GPS) sensors, cameras, Light Detection and Ranging (LiDAR) sensors, Radio Detection and Ranging (RADAR) sensors, Sound Navigation and Ranging (SONAR) sensors, ultrasonic sensors, or any of a wide variety of other sensors 18 without departing from the scope or intent of the present disclosure. The sensors 18 may be integrated with the ego vehicle 12 by the ego vehicle 12 manufacturer, or the sensors 18 may be fitted in an after-sales service performed by the ego vehicle 12 or sensor 18 manufacturer, by the customer, or by other third parties without departing from the scope or intent of the present disclosure. In some examples, the sensor 18 or sensors 18 may be part of a stand-alone sensor 18 system, a part of the HMI 22, or the like without departing from the scope or intent of the present disclosure. In several examples, the HMI 22 may be an onboard infotainment screen, an instrument cluster, or the like disposed within or on a vehicle 12, and/or the HMI 22 may be a user-provided device, including but not limited to a screen integrated with the sensor 18, or a third-party device such as a smart phone 22', tablet computer, laptop computer, desktop computer, television, monitor, or any other such HMI 22 having a screen visible to humans for depicting images and/or videos.

The control modules 20 are non-generalized electronic control devices having a preprogrammed digital computer or processor 26, non-transitory computer readable medium or memory 28 used to store data such as control logic, software applications, instructions, computer code, data, lookup tables, etc., and one or more input/output (I/O) ports 30. Computer readable medium or memory 28 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 28 excludes wireless, optical, or other communication links that transport electrical or other signals. A non-transitory computer readable medium or memory 28 includes media where data can be permanently stored and media where data can be stored and later overwritten, such as any type of program code, including source code, object code, and executable code. The processor 26 is configured to execute the code or instructions. In some examples, the control module 20 may be a dedicated wireless or Wi-Fi controller. The I/O ports 30 are configured to communicate through wired or wireless means using Wi-Fi protocols under IEEE 802.11x, Bluetooth communications protocols, radio frequency (RF) protocols, or the like.

In several aspects, the control modules 20 include one or more applications 32. An application 32 is a software program configured to perform specific functions or sets of functions. The application 32 may include one or more computer programs, software components, sets of instructions, procedures, functions, objects, classes, instances, related data, or a portion thereof adapted for implementation in a suitable computer readable program code. The applications 32 may be stored within the memory 28 or in an additional or separate memory 28. Examples of the applications 32 include audio or video streaming services, audio or visual processing services, and the like.

Figure 2:
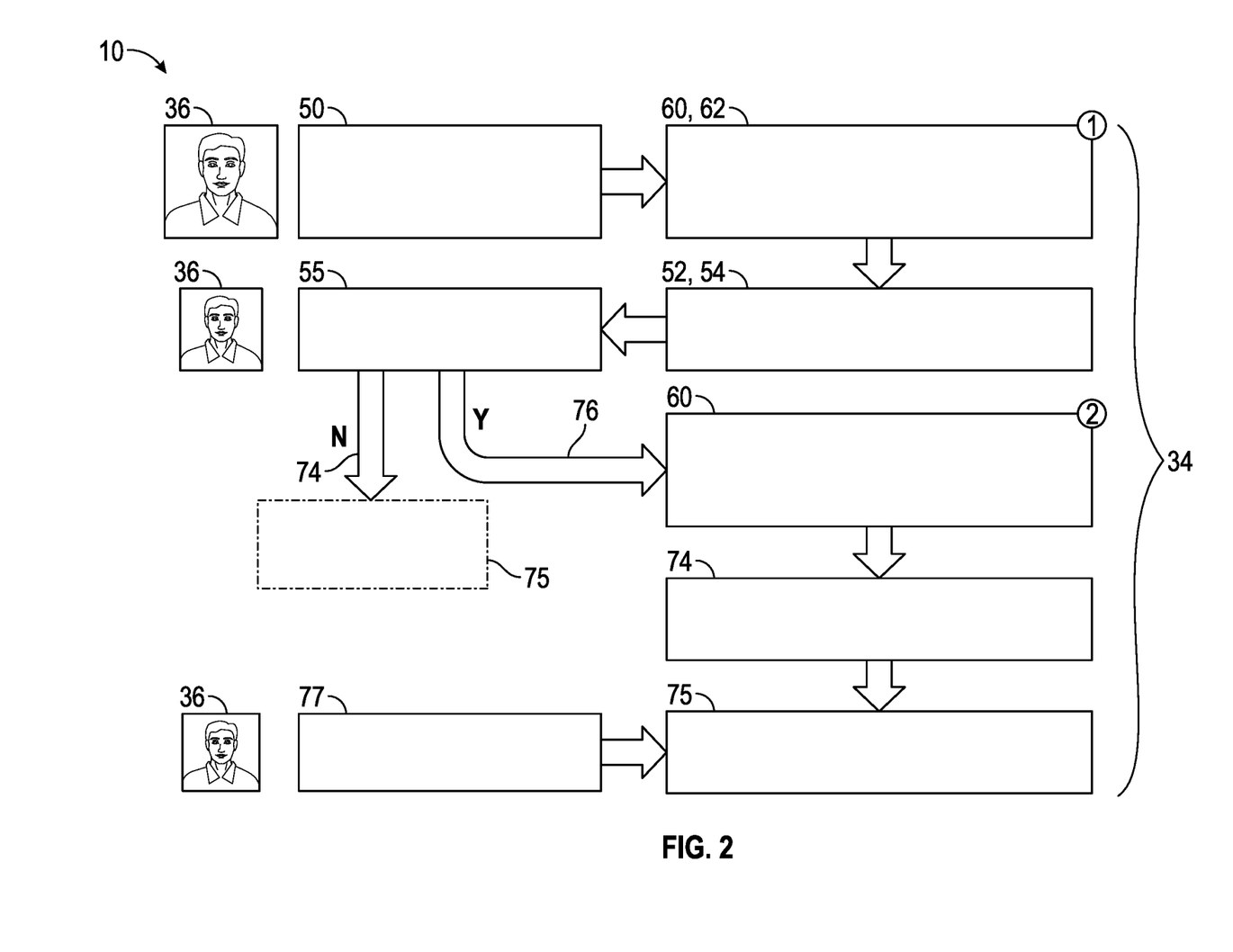
FIG. 2 is a simplified flowchart depicting logical flow of programmatic control logic functions of the system for LVF without V2V communication of FIG. 1 according to an exemplary embodiment.
Figure 3A:
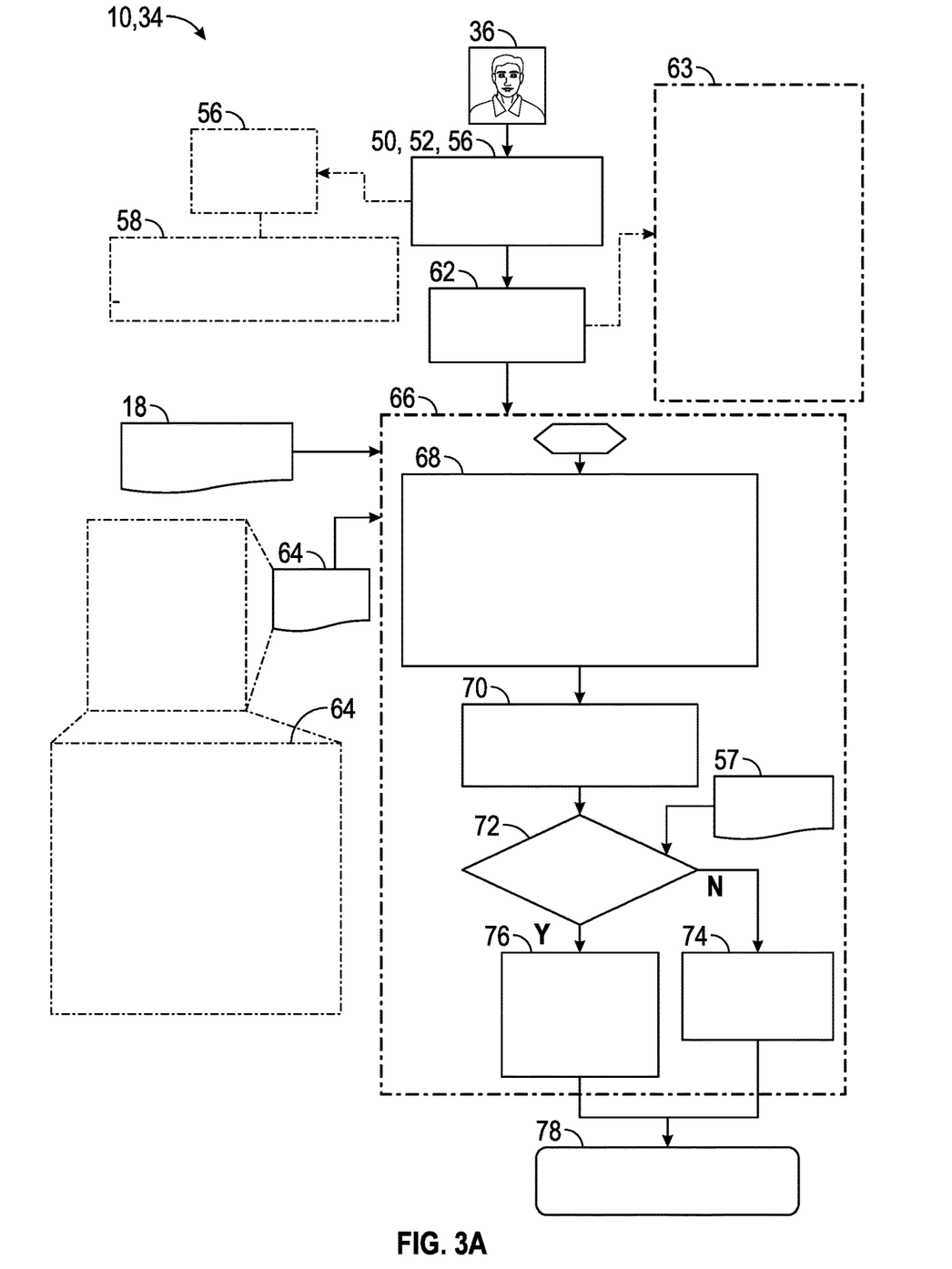
FIG. 3A is a detailed logical flowchart depicting programmatic control logic functions of a first portion of the system for LVF without V2V communication of FIG. 2 according to an exemplary embodiment.
Figure 3B:
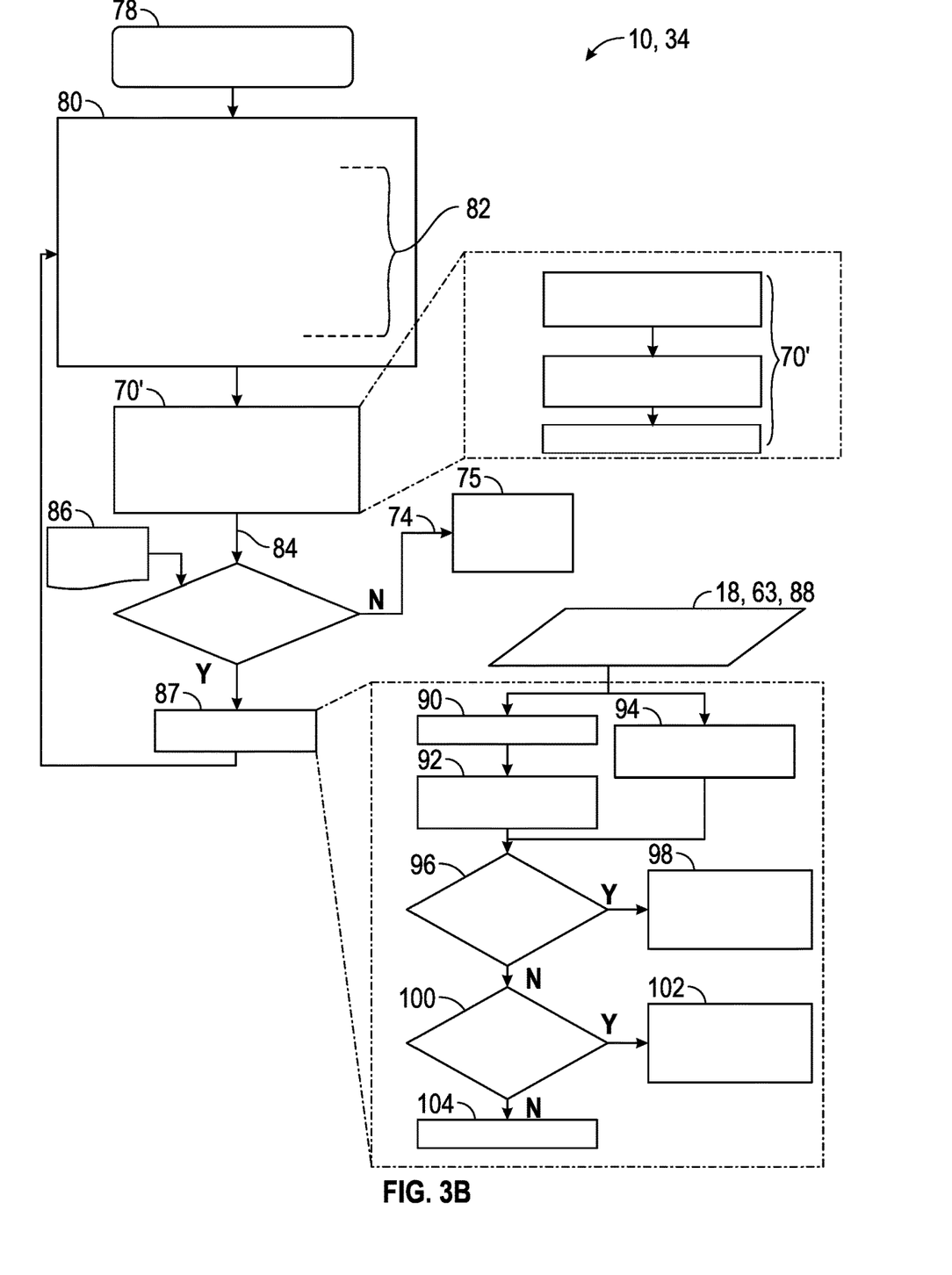
FIG. 3B is a detailed logical flowchart depicting programmatic control logic functions of a second portion of the system for LVF without V2V communication of FIG. 2 according to an exemplary embodiment.

Turning now to FIGS. 2, 3A and 3B and with continuing reference to FIG. 1, the system 10 is shown in further detail. More specifically, FIG. 2 depicts an overall logical flow of a lead vehicle 12' following (LVF) application 34 that allows the ego vehicle 12 to follow a lead vehicle 12' without V2V communication. The LVF application 34 is stored in memory 28 of at least one control module 20 of the ego vehicle 12. In several aspects, the LVF application 34 contains a plurality of subroutines or programmatic control logics that enable the ego vehicle 12 to follow a lead vehicle 12' without the use of V2V communications.

In an ego vehicle 12 equipped with the system 10 of the present disclosure, a vehicle occupant 36 may engage the system 10 for lead vehicle 12' following through the HMI 22 through one or more on-screen prompts or requests presented by execution of a first control logic 50 of the LVF application 34. In several aspects, the one or more on-screen prompts or requests define a start prompt 52 and a confirmation prompt 54. The start prompt may take any of a variety of forms, including but not limited to presenting through audio and/or visual means of one or more HMIs 22 that the LVF application 34 is available. In response to the presentation of the start prompt, the vehicle occupant 36 may initiate the LVF application 34, by selecting the start prompt which generates a start input or first input 55 to the system. The first input 55 is a start or activation command which is received by the I/O ports 30 of the control module 20 and the control module 20 subsequently causes the system 10 to generate the second or confirmation prompt 54.

Now turning particularly to FIG. 3A, but with continuing reference to FIGS. 1-2, and 3B, the confirmation prompt 54 presents two or more mode selection options to the vehicle occupant 36. The mode selection options 56 include at least a friend mode and a public mode. In several aspects, when the lead vehicle 12' is a known vehicle, the vehicle occupant 36 may select the friend mode. In the friend mode, the LVF application 34 operates to follow a lead vehicle 12' with high confidence. That is, because the lead vehicle 12' in the friend mode is known to the ego vehicle 12 occupants 36, it is understood that the lead vehicle 12' highly likely to perform predictably and safely as it is driven. By contrast, when the public mode option is selected, the system 10 understands that the lead vehicle 12' selected is unknown to the ego vehicle's 12 occupants 36, and therefore, it is unknown how likely the public lead vehicle 12' will be to perform predictably and safely as it is driven. Accordingly, confidence thresholds 57 for friend lead vehicles 12' are higher than confidence thresholds for public lead vehicles 12'. In several aspects, the system 10 may present the vehicle occupant 36 with additional prompts that provide options for lead vehicle 12' following distance 58 within predefined and/or flexible constraints such as close, mid-range, or long following distances which may vary based on visibility, road 14 conditions, weather, and the like.

Upon receiving a mode selection from the vehicle occupant 36, the LVF application 34 executes a second control logic 60 that performs a feasibility analysis of lead vehicle 12' and ego vehicle 12 conditions. In several aspects, the second control logic performs an environmental analysis 62 of the ego vehicle's 12 surroundings. To perform the environmental analysis 62, the second control logic obtains data from the sensors 18 regarding environmental conditions 63 such as weather conditions, road 14 conditions, road 14 type, lane marking or line 16 type and clarity, visibility, location information, and the like. Results of the environmental analysis 62 are forwarded to a fusion control logic 66 that fuses the environmental analysis 62 data with feasibility criteria 64 and with real-time sensor 18 input data to generate a feasibility score.

The feasibility criteria 64 or constraints may take a variety of forms and cover a wide range of topics without departing from the scope or intent of the present disclosure. In some examples, the feasibility criteria 64 include predefined limitations on what varieties of lead vehicles 12' can be followed using the LVF application 34. The predefined limitations may, for example, prevent trucks or school busses from being followed while the LVF application 34 is active. Further feasibility criteria 64 may include preferences for specific lanes 15, preferences for certain types of caravan or other holiday vehicles 12, 12', predefined safety or confidence thresholds 57 or the like. In several aspects, the feasibility criteria 64 include predefined values that may be hard coded in a configuration file, and may contain a variety of different parameters that vary from application to application and from jurisdiction to jurisdiction. In several aspects, the feasibility criteria 64 may be defined in part based on local legal requirements, local road 14 types, and the like.

The fusion control logic 66 performs a series of calculations to determine whether or not the LVF application 34 may be run with respect to a selected lead vehicle 12'. In a first calculation 68, the fusion control logic 66 accumulates feasibility conditions including but not limited to: lead vehicle 12' type, lane 15 preference, calculations of distance between ego and lead vehicles 12, 12', speed of the ego and lead vehicles 12, 12'. Additionally lead vehicle 12' driving behavior is ascertained and information regarding the whether the lead vehicle 12' is driving at a relatively steady state and substantially centered in the middle of a preferred lane 15 is collected. The fusion control logic 66 also obtains information regarding brake and indicator light status of the lead vehicle 12' along with other such information.

The feasibility condition information is fed into a learning model 70. In several aspects, the learning model 70 may be a machine learning (ML) or artificial intelligence (AI) model, a decision tree, or a fuzzy logic algorithm. The learning model 70 combines data from the first calculation 68 and generates the feasibility score based thereon. The feasibility score defines a numerical confidence level or score that is applicable to a selected lead vehicle 12' and indicates whether the ego vehicle 12 may be capable of following the selected lead vehicle 12'. The feasibility score is then compared to a confidence threshold 57 at block 72. As noted above, confidence thresholds 57 for friend lead vehicles 12' are higher than confidence thresholds 57 for public lead vehicles 12'. In general, however, confidence 57 are predefined criteria that may be hard coded in a config file, and containing a variety of different parameters that may vary from application to application and from jurisdiction to jurisdiction. In several aspects, the confidence thresholds 57 may be defined in part based on local legal requirements, local road 14 types, and the like. In general, it should be appreciated that the confidence thresholds 57 indicate a likelihood that the lead vehicle 12' will behave predictably and can therefore be a proper target for the LVF application 34 and the ego vehicle 12 to follow.

Upon determining that the feasibility score is less than the confidence threshold 57, the fusion control logic 66 will generate an output 74 to the vehicle occupants 36 via the HMI 22. In several aspects, the output 74 is an audio and/or visual cue that indicates that the LVF application 34 will not be activated and/or is currently unavailable with respect the selected lead vehicle 12'. Further, the output 74 indicates to the vehicle occupant 36 that ego vehicle 12 control will be manual 75 (i.e. controlled by the vehicle occupant 36), and/or that advanced driver assistance system (ADAS) control will continue, but that the selected lead vehicle 12' will not specifically be followed. It should be appreciated, that even when the LVF application 34 is actively controlling the ADAS functions of the ego vehicle 12, the vehicle occupants 36 may disengage the LVF application through a disengagement command 77 via the HMI 22, or by taking over manual control of the ego vehicle's 12 steering, braking, and/or acceleration controls.

However, when the system 10 determines that the feasibility score is greater than or equal to the confidence threshold 57, the fusion control logic 66 generates a second output 76 to the HMI 22 includes a notification that the LVF application 34 is available for the selected lead vehicle 12'. The second output 76 includes a confirmation prompt that is presented via the HMI 22 to the vehicle occupant 36. In several aspects, the confirmation prompt is an audiovisual prompt that requests vehicle occupant 36 action to confirm that the LVF application 34 should be initialized and activated with respect to the selected lead vehicle 12'. Upon receiving confirmation from the vehicle occupant 36, the LVF application 34 is engaged and activated at block 78 with respect to the selected lead vehicle 12', and the LVF application 34 begins ADAS functions to follow the selected lead vehicle 12'.

Turning now specifically to FIG. 3B and with continuing reference to FIGS. 1-3A, upon engaging and activating at block 78 the LVF application 34, the control module 20 executes a control logic 80 to continuously monitor feasibility of utilizing the LVF application 34 to follow the selected lead vehicle 12'. The LVF application 34 continuously monitors safety and confidence score criteria 82 while the LVF application 34 is in use. In several aspects, the continuously monitored safety and confidence score criteria 82 include the distance between the ego and lead vehicles 12, 12', determinations of lead vehicle 12' driving behavior including: information regarding the whether the lead vehicle 12' is driving at a relatively steady state and substantially centered in the middle of a preferred lane 15. Additional safety and confidence score criteria 82 include determinations of the visibility and functionality of the lead vehicle's 12' brake and indicator lights, overall visibility, and information regarding any rapid or unpredictable maneuvers carried out by the lead vehicle 12'. The continuously monitored safety and confidence score criteria 82 are fed into a confidence score model 70'.

In several aspects, the confidence score model 70' is substantially similar to the learning model 70 described hereinabove. That is, the confidence score model 70' may be a machine learning (ML) or artificial intelligence (AI) model, a decision tree, or a fuzzy logic algorithm, or the like. The confidence score model 70' combines data from continuously monitored safety and confidence score criteria 82 and generates a confidence score 84 based thereon. The confidence score 84 defines a numerical confidence level or score that is applicable to a selected lead vehicle 12' while the LVF application 34 is active and engaged and indicates whether the ego vehicle 12 continues to be capable of following the selected lead vehicle 12'. The confidence score 84 is then compared to a confidence threshold 86 at block 88. As noted above, confidence thresholds 86 for friend lead vehicles 12' are higher than confidence thresholds 86 for public lead vehicles 12'. In general, however, confidence thresholds 86 are predefined criteria that indicate a likelihood that the lead vehicle 12' will behave predictably and can therefore be a trustworthy and appropriate target for the LVF application 34 and the ego vehicle 12 to follow. In instances where the confidence score 84 is less than the confidence threshold 86, the LVF application 34 will generate an output 74 to the vehicle occupants 36 via the HMI 22. In several aspects, the output 74 is an audio and/or visual cue that indicates that the LVF application 34 is currently unavailable with respect the selected lead vehicle 12', or that the LVF application 34 is disengaging and directing ego vehicle 12 control back to the vehicle occupants 36 and/or to the ADAS system of the vehicle, but that the selected lead vehicle 12' will no longer be automatically followed.

By contrast, upon determining that the confidence score 84 is greater than or equal to the confidence threshold 86, an additional control logic 87 of the LVF application 34 is executed to enable the ego vehicle 12 to automatically follow the selected lead vehicle 12' through a combination of ADAS functions and the LVF application 34. In some specific examples, the LVF application 34 selectively engages the various ADAS system functions to follow the selected lead vehicle 12' through a variety of different maneuvers. Since the LVF application 34 is continuously receiving data from the sensors 18 in order to calculate the confidence score 84 and other parameters, these sensor data are also fused at block 88 to assist in tracking 90 the lead vehicle 12', to update the lead vehicle 12' state 92, and to update the ego vehicle 12 state 94. After updating the ego and lead vehicle 12, 12' states 92, 94, control logic within the LVF application 34 is executed to determine 96 whether the lead vehicle 12' is in the process of moving from one lane 15 to another lane 15 on the road 14.

Upon determining that the lead vehicle 12' is, in fact, changing lanes from a first lane 15' to a second lane 15", the LVF application 34 effectively re-executes the second control logic to continuously determine the feasibility of continuing to follow the lead vehicle 12' through the lane change. At block 98, when the feasibility analysis indicates that the ego vehicle 12 may perform a similar lane change as that being executed by the lead vehicle 12', the LVF application 34 will engage one or more ADAS functions such as: an automatic lane change function, an acceleration function or automatic speed control function, and a lane keeping function to initiate and perform a lane change, and then to maintain the ego vehicle's 12 position within the second lane 15" while following the lead vehicle 12'. However, at block 96, when the lead vehicle 12' has been determined not to be in the process of changing lanes, control logic within the LVF application 34 is executed at block 100 to determine whether the lead vehicle 12' is already in a lane 15" different from that in which the ego vehicle 12 currently resides. Upon determining that the lead vehicle 12' is in a lane 15" different from the lane 15' in which the ego vehicle 12 currently resides, the LVF application 34 effectively re-executes the second control logic to continuously determine the feasibility of continuing to follow the lead vehicle 12' even though the lead vehicle 12' is in a different lane 15".

At block 102, when the feasibility analysis indicates that the ego vehicle 12 may perform a lane change to continue following the lead vehicle 12', the LVF application 34 will engage one or more ADAS functions such as: an automatic lane change function, deactivating a lane keep function, and performing an acceleration function or automatic speed control function, and then to reactivate the lane keep function, in order to initiate and perform a lane change from the first lane 15' to the second lane 15", and then to maintain the ego vehicle's 12 position within the second lane 15" while following the lead vehicle 12'. When the feasibility analysis indicates that the ego vehicle 12 is unable to safely perform a lane change to continue following the lead vehicle 12', then the LVF application 34 exits and generates an audiovisual notification to the vehicle occupants 36 indicating that the LVF application 34 is currently unavailable with respect the selected lead vehicle 12', or that the LVF application 34 is disengaging and directing ego vehicle 12 control back to the vehicle occupants 36 and/or to the ADAS system of the vehicle, but that the selected lead vehicle 12' will no longer be automatically followed.

Finally, when at block 100, it is determined that the lead vehicle 12' is not in a lane 15 different from that in which the ego vehicle 12 currently resides, then at block 104 the LVF application 34 engages the acceleration function or automatic speed control function, and the lane keep function of the ADAS system to continue following the lead vehicle 12'. It should be appreciated that from block 104 in FIG. 3B, control logic of the LVF application 34 returns to the control logic 80 that continuously monitors feasibility of utilizing the LVF application 34 to follow the selected lead vehicle 12'. Further, the LVF application 34 runs continuously unless and until the confidence thresholds 57, 86 and/or feasibility criteria 64 are not met and/or the vehicle occupant 36 disengages the system to obtain manual control 75 of the ego vehicle 12. Once the LVF application 34 has exited to manual control 75, the LVF application 34 may be re-engaged by the vehicle occupant 36 through the one or more on-screen prompts or requests presented by execution of the first control logic 50 of the LVF application 34, whereupon the features and steps described in relation to FIGS. 3A and 3B run once more.

Figure 4:
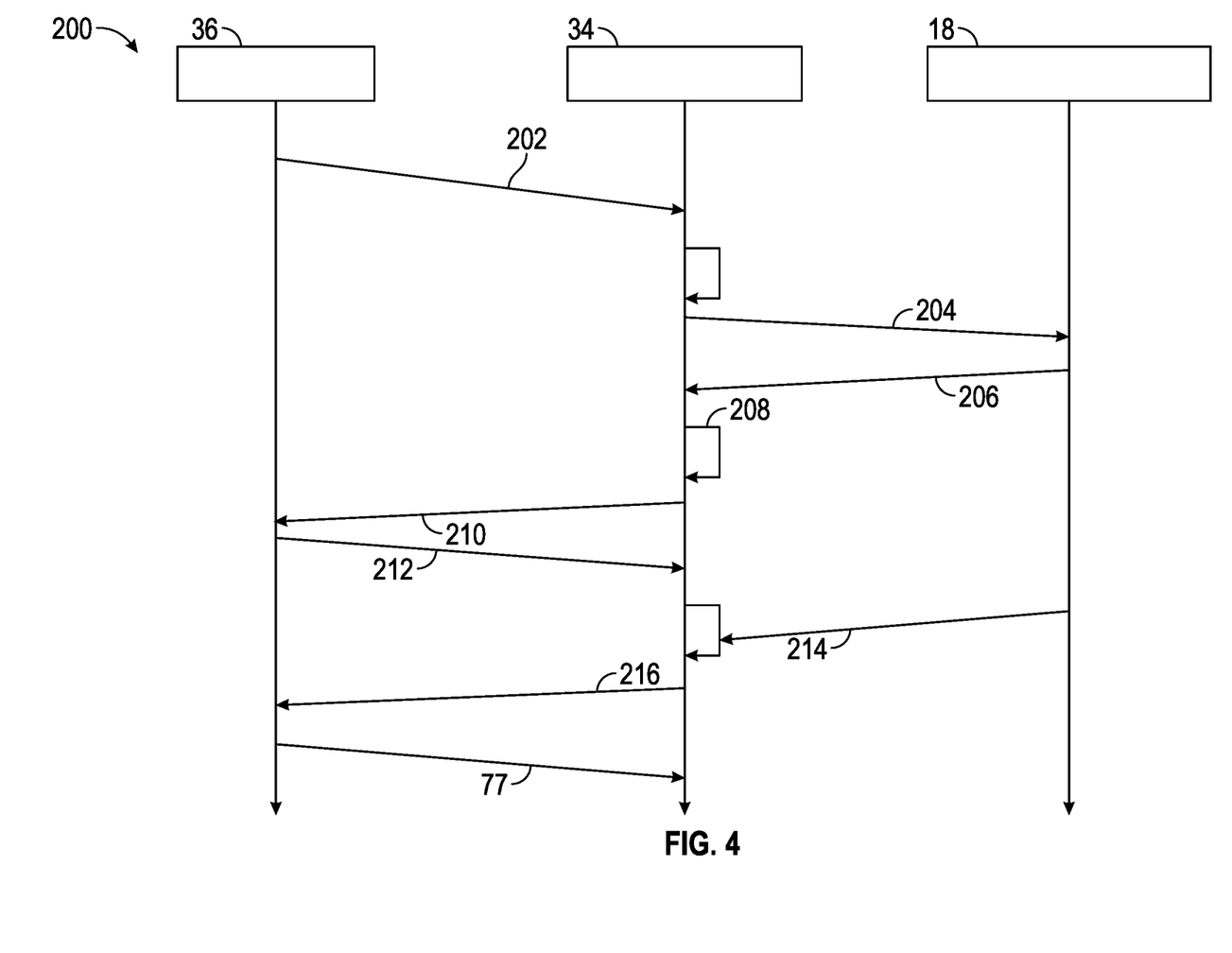
FIG. 4 is a flow diagram depicting a method for LVF without V2V communication according to an exemplary embodiment.

Turning now to FIG. 4 and with continuing reference to FIGS. 1-3B a logical flow diagram depicting a method 200 for an ego vehicle 12 to follow a lead vehicle 12' without V2V communication. The method 200 starts at a top left of the flow diagram. At the beginning of the method 200, the vehicle occupant 36 generates an engagement request 202. The engagement request 202 is forwarded to the LVF application 34. The LVF application 34 utilizes profile based request information and constraints to determine which vehicle occupant 36 has made the engagement request 202 and whether any preferences or constraints are applicable as a result. The profile based request information or preferences may include friend mode or public mode, a particular vehicle occupant's 36 following distance preferences, or the like. The LVF application 34 subsequently sends a data request 204 to the various sensors 18 of the ego vehicle 12. The sensors 18 respond to the data request 204 by sending real-time sensor data 206 to the LVF application 34. In some aspects, the real-time sensor data 206 may be fused at the sensor 18 level, or within the LVF application 34, or within additional applications 32 executable by the one or more control modules 20 of the system 10. Upon receiving the real-time sensor data 206, the LVF application 34 performs an initialization and feasibility check 208 according to the principles previously described. The LVF application 34 generates a feasibility decision and confirmation request 210 to the vehicle occupant 36. In several aspects, the feasibility decision includes allowing the LVF application 34 to be engaged when the feasibility score is greater than or equal to the confidence threshold, or prevents the LVF application 34 from operating when the feasibility score is less than the confidence threshold. In response to the confirmation request, the vehicle occupants 36 send confirmation 212 to the LVF application 34.

When the confirmation 212 is in response to a feasibility decision that allows the LVF application 34 to run, the LVF application engages to follow the lead vehicle 12' and utilizes the sensors 18 to continuously monitor and evaluate 214 the ego and lead vehicle 12, 12' states as well as numerous other environmental and locational parameters as discussed previously. The continuous monitoring and evaluation 214 include continuously generating feasibility data and comparing the feasibility data to predefined confidence threshold values to continuously generate a feasibility score. In several aspects, when the continuous monitoring and evaluation 214 produces a feasibility decision that prevents the LVF application 34 from operating because the feasibility score is less than the confidence threshold, then the method 200 produces a handover request 216 and informs the vehicle occupants 36 of LVF application 34 disengagement information via the HMI 22. By contrast, when the feasibility score is greater than or equal to the confidence threshold, the LVF application 34 continues to be engaged unless a disengagement command 77 is generated by the vehicle occupants 36 and received by the LVF application 34 through the HMI 22. The method 200 of the present disclosure may operate continuously, iteratively, periodically, or on an ad hoc basis as may be requested or required by the vehicle occupants 36.

A system 10 and method 200 for an ego vehicle 12 to follow a lead vehicle 12' without V2V communication of the present disclosure offers several advantages. These include the ability to operate to allow ego vehicles 12 to follow lead vehicles 12' without the use of V2V or V2I communication, and without increasing complexity, while improving ADAS functionality and redundancy, and while maintaining or improving vehicle occupant 36 comfort.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for controlling an ego vehicle following a lead vehicle without vehicle-to-vehicle (V2V) communication, the system comprising:
    one or more sensors disposed on the ego vehicle and capturing ego vehicle condition information and lead vehicle condition information;
    one or more control modules disposed in the ego vehicle, each of the one or more control modules having a processor, a memory, and one or more input/output (I/O) ports, the I/O ports in communication with the one or more sensors; the memory storing programmatic control logic, the processor executing the programmatic control logic, the programmatic control logic including a lead vehicle following (LVF) application comprising:
    a first control logic for receiving a start input from a vehicle occupant via a human-machine interface (HMI) in communication with the I/O ports, including:
        control logic for presenting the vehicle occupant with a first prompt and a second prompt;
        wherein in response to receiving the first prompt, the vehicle occupant generates the start input that initializes a LVF application; and
        wherein in response to initializing the LVF application, the second prompt is presented to the vehicle occupant, wherein the second prompt presents a friend mode selection and a public mode selection, wherein in response to the second prompt, the vehicle occupant selects a known lead vehicle via the friend mode selection, or wherein the vehicle occupant selects an unknown lead vehicle via the public mode selection;
    a second control logic for performing a feasibility analysis of ego vehicle and lead vehicle conditions according to feasibility conditions;
    a third control logic for selectively initiating lead vehicle following;
    a fourth control logic for continuously monitoring feasibility of lead vehicle following; and
    a fifth control logic for selectively disabling the LVF application upon receiving a disengagement command.

2. The system of claim 1, wherein the second control logic further comprises:

control logic for determining environmental conditions, wherein the environmental conditions comprise:

identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning system (GPS) availability, visibility, weather conditions, road type, road conditions, ego vehicle type, and lead vehicle type.

3. The system of claim 2, wherein the second control logic further comprises:

control logic for calculating a feasibility score from the feasibility conditions; and control logic for comparing the feasibility score to an initialization threshold;

upon determining that the feasibility score is less than the initialization threshold presenting a notice of unavailability to the vehicle occupant, and engaging a manual driving mode of the ego vehicle; and upon determining that the feasibility score is greater than or equal to the initialization threshold, presenting the vehicle occupant with a second prompt, wherein the second prompt is a request for confirmation to initialize the LVF application.

4. The system of claim 3 wherein the third control logic further comprises:

control logic for receiving a confirmation input, via the HMI, from the vehicle occupant; and engaging the LVF application and following the lead vehicle.

5. The system of claim 3, wherein the fourth control logic for continuously monitoring feasibility of lead vehicle following further comprises:

continuously monitoring the environmental conditions;

continuously monitoring the lead vehicle state, including the state of the lead vehicle brake lights, the lead vehicle indicator lights, and the position of the lead vehicle within the one or more lanes;

continuously monitoring an ego vehicle state; and continuously monitoring a distance from the ego vehicle to the lead vehicle.

6. The system of claim 5, wherein upon determining that the lead vehicle is changing lanes from a first lane to a second lane of the one or more lanes, re-executing the second control logic to determine feasibility of continuing to follow the lead vehicle utilizing the LVF application; and upon determining that the feasibility score is less than the initialization threshold presenting a notice of unavailability to the vehicle occupant, and generating the disengagement command to disengage the LVF application and engaging at least one of: a manual driving mode of the vehicle and an advanced driver assistance system (ADAS) assisted driving mode of the vehicle, wherein the ADAS assisted driving mode operates without the LVF application; and upon determining that the feasibility score is greater than or equal to the initialization threshold, selectively activating one or more ADAS functions of the ego vehicle to cause the ego vehicle to continue following the lead vehicle from the first lane to the second lane.

7. The system of claim 6, wherein upon determining that the lead vehicle is not changing lanes, executing control logic to determine whether a lead vehicle lane is different from a current ego vehicle lane; and upon determining that the lead vehicle is in a different lane from the current ego vehicle lane, determining a feasibility of continuing to follow the lead vehicle utilizing the LVF application; and upon determining that the feasibility score is less than the initialization threshold presenting a notice of unavailability to the vehicle occupant, and generating the disengagement command to disengage the LVF application and engaging at least one of: a manual driving mode of the vehicle and an ADAS assisted driving mode of the vehicle, wherein the ADAS assisted driving mode operates without the LVF application; and upon determining that the feasibility score is greater than or equal to the initialization threshold, selectively activating one or more ADAS functions to cause the ego vehicle to move from the current ego vehicle lane to the lead vehicle lane.

8. The system of claim 6, wherein the one or more ADAS functions further comprise:

an automatic lane change function;

an automatic lane keep function; and an automatic speed control function.

9. The system of claim 1, wherein the fifth control logic further comprises:

receiving a manual disengagement command from the vehicle occupant; and in response to receiving the manual disengagement command, disengaging the LVF application and engaging at least one of: a manual driving mode of the ego vehicle and an ADAS assisted driving mode of the ego vehicle, wherein the ADAS assisted driving mode operates without the LVF application.

10. A method for controlling an ego vehicle following a lead vehicle without vehicle-to-vehicle (V2V) communication, the method comprising:

capturing ego vehicle condition information and lead vehicle condition information with one or more sensors disposed on the ego vehicle;

utilizing one or more control modules disposed in the ego vehicle, each of the one or more control modules having a processor, a memory, and one or more input/output (I/O) ports, the memory storing programmatic control logic, the processor executing the programmatic control logic, the programmatic control logic including a lead vehicle following (LVF) application comprising:

receiving a start input from a vehicle occupant via a human-machine interface (HMI) in communication with the I/O ports;

performing a feasibility analysis of ego vehicle and lead vehicle conditions according to feasibility conditions, including:

determining environmental conditions from the ego vehicle condition information and the lead vehicle condition information, wherein the environmental conditions comprise:

identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning method (GPS) availability, visibility, weather conditions, road type, road conditions, ego vehicle type, and lead vehicle type;

selectively initiating the LVF application;

continuously monitoring feasibility of using the LVF application; and selectively disabling the LVF application upon receiving a disengagement command.

11. The method of claim 10, further comprising:
presenting the vehicle occupant with a first prompt and a second prompt;
in response to the first prompt, receiving a start input from the vehicle occupant, wherein the start input initializes the LVF application; and
in response to initializing the LVF application, presenting the second prompt to the vehicle occupant, wherein the second prompt presents a friend mode selection and a public mode selection, wherein in response to the second prompt, the vehicle occupant selects a known lead vehicle via the friend mode selection, or wherein the vehicle occupant selects an unknown lead vehicle via the public mode selection.

12. The method of claim 11, further comprising:
calculating a feasibility score from the feasibility conditions; and
comparing the feasibility score to an initialization threshold;
upon determining that the feasibility score is less than the initialization threshold presenting a notice of unavailability to the vehicle occupant, and engaging a manual driving mode of the ego vehicle;
upon determining that the feasibility score is greater than or equal to the initialization threshold, presenting the vehicle occupant with a second prompt, wherein the second prompt is a request for confirmation to initialize the LVF application;
receiving a confirmation input, via the HMI, from the vehicle occupant; and
engaging the LVF application and following the lead vehicle.

13. The method of claim 12, further comprising:
continuously monitoring feasibility of utilizing the LVF application, including:
continuously monitoring the environmental conditions;
continuously monitoring the lead vehicle state, including the state of the lead vehicle brake lights, the lead vehicle indicator lights, and the position of the lead vehicle within the one or more lanes;
continuously monitoring an ego vehicle state; and
continuously monitoring a distance from the ego vehicle to the lead vehicle.

14. The method of claim 13, further comprising:
determining that the lead vehicle is changing lanes from a first lane to a second lane of the one or more lanes;
continuously determining the feasibility of continuing to follow the lead vehicle utilizing the LVF application; and
upon determining that the feasibility score is less than the initialization threshold presenting a notice of unavailability to the vehicle occupant, and generating the disengagement command to disengage the LVF application and engaging at least one of:
a manual driving mode of the vehicle and an automated driver assistance system (ADAS) assisted driving mode of the vehicle, wherein the ADAS assisted driving mode operates without the LVF application; and
upon determining that the feasibility score is greater than or equal to the initialization threshold, selectively activating one or more ADAS functions of the ego vehicle to cause the ego vehicle to continue following the lead vehicle from the first lane to the second lane.

15. The method of claim 14, further comprising:
determining that the lead vehicle is not changing from the first lane to the second lane, and determining that a lead vehicle lane is different from a current ego vehicle lane; and
upon determining that the lead vehicle is in a different lane from the current ego vehicle lane, determining the feasibility of continuing to follow the lead vehicle utilizing the LVF application; and
upon determining that the feasibility score is less than the initialization threshold presenting a notice of unavailability to the vehicle occupant, and generating the disengagement command to disengage the LVF application and engaging at least one of: a manual driving mode of the vehicle and an ADAS assisted driving mode of the vehicle, wherein the ADAS assisted driving mode operates without the LVF application; and
upon determining that the feasibility score is greater than or equal to the initialization threshold, selectively activating one or more ADAS functions to cause the ego vehicle to move from the current ego vehicle lane to the lead vehicle lane.

16. The method of claim 14, wherein selectively activating one or more ADAS functions further comprises:
engaging one or more of: an automatic lane change function, an automatic lane keep function; and an automatic speed control function.

17. The method of claim 10, further comprising:
receiving a manual disengagement command from the vehicle occupant; and
in response to receiving the manual disengagement command, disengaging the LVF application and engaging at least one of: a manual driving mode of the ego vehicle and an ADAS assisted driving mode of the ego vehicle, wherein the ADAS assisted driving mode operates without the LVF application.

18. A method for controlling an ego vehicle following a lead vehicle without vehicle-to-vehicle (V2V) communication, the method comprising:
capturing ego vehicle condition information and lead vehicle condition information with one or more sensors disposed on the ego vehicle;
utilizing one or more control modules disposed in the ego vehicle, each of the one or more control modules having a processor, a memory, and one or more input/output (I/O) ports, the memory storing programmatic control logic, the processor executing the programmatic control logic, the programmatic control logic including a lead vehicle following (LVF) application comprising:
receiving a start input from a vehicle occupant via a human-machine interface (HMI) in communication with the I/O ports, wherein receiving a start input further comprises:
presenting the vehicle occupant with a first prompt and a second prompt;
in response to the first prompt, receiving the start input from the vehicle occupant, wherein the start input initializes the LVF application;
in response to initializing the LVF application, presenting the second prompt to the vehicle occupant, wherein the second prompt presents a friend mode selection and a public mode selection, wherein in response to the second prompt, the vehicle occupant selects a known lead vehicle via the friend mode selection, or wherein the vehicle occupant selects an unknown lead vehicle via the public mode selection;

determining environmental conditions from the ego vehicle condition information and the lead vehicle condition information, wherein the environmental conditions comprise:
  identifying a lead vehicle, identifying one or more lanes, calculating a distance to the lead vehicle, determining a lead vehicle state and position in the one or more lanes, determining a state of lead vehicle indicator lights and a state of lead vehicle brake lights, road marking clarity, global positioning method (GPS) availability, visibility, weather conditions, road type, road conditions, ego vehicle type, and lead vehicle type;
performing a feasibility analysis of ego vehicle and lead vehicle conditions according to feasibility conditions by:
  calculating a feasibility score from the feasibility conditions;
  comparing the feasibility score to an initialization threshold;
  upon determining that the feasibility score is less than the initialization threshold presenting a notice of unavailability to the vehicle occupant, and engaging a manual driving mode of the ego vehicle;
  upon determining that the feasibility score is greater than or equal to the initialization threshold, presenting the vehicle occupant with a second prompt, wherein the second prompt is a request for confirmation to initialize the LVF application;
selectively initiating the LVF application upon receiving a confirmation input, via the HMI, from the vehicle occupant;
engaging the LVF application and following the lead vehicle;
continuously monitoring feasibility of utilizing the LVF application, including:
  continuously monitoring the environmental conditions;
  continuously monitoring the lead vehicle state, including the state of the lead vehicle brake lights, the lead vehicle indicator lights, and the position of the lead vehicle within the one or more lanes;
  continuously monitoring an ego vehicle state;
  continuously monitoring a distance from the ego vehicle to the lead vehicle;
    determining that the lead vehicle is changing lanes from a first lane to a second lane of the one or more lanes;
    continuously determining the feasibility of continuing to follow the lead vehicle utilizing the LVF application;
    upon determining that the feasibility score is less than the initialization threshold presenting a notice of unavailability to the vehicle occupant, and generating a disengagement command to disengage the LVF application and engaging at least one of:
      a manual driving mode of the ego vehicle and an ADAS assisted driving mode of the ego vehicle, wherein the ADAS assisted driving mode operates without the LVF application;
    upon determining that the feasibility score is greater than or equal to the initialization threshold, selectively activating one or more advanced driver assistance method (ADAS) functions of the ego vehicle to cause the ego vehicle to continue following the lead vehicle from the first lane to the second lane;
  determining that the lead vehicle is not changing from the first lane to the second lane, and determining that a lead vehicle lane is different from a current ego vehicle lane;
  upon determining that the lead vehicle is in a different lane from the current ego vehicle lane, determining the feasibility of continuing to follow the lead vehicle utilizing the LVF application;
  upon determining that the feasibility score is less than the initialization threshold presenting a notice of unavailability to the vehicle occupant, and generating the disengagement command to disengage the LVF application and engaging at least one of:
    a manual driving mode of the ego vehicle and an ADAS assisted driving mode of the ego vehicle, wherein the ADAS assisted driving mode operates without the LVF application;
    upon determining that the feasibility score is greater than or equal to the initialization threshold, selectively activating one or more ADAS functions to cause the ego vehicle to move from the current ego vehicle lane to the lead vehicle lane;
selectively disabling the LVF application upon receiving a manual disengagement command generated by the vehicle occupant; and
in response to receiving the manual disengagement command, disengaging the LVF application and engaging at least one of: a manual driving mode of the ego vehicle and an ADAS assisted driving mode of the ego vehicle, wherein the ADAS assisted driving mode operates without the LVF application.

* * * * *